(12) United States Patent
Shang et al.

(10) Patent No.: US 11,271,892 B2
(45) Date of Patent: Mar. 8, 2022

(54) NETWORK COMMUNICATION METHOD AND SYSTEM, DEVICE, AND STORAGE MEDIUM

(71) Applicant: Tencent Technology (Shenzhen) Company Limited, Shenzhen (CN)

(72) Inventors: Zhihao Shang, Shenzhen (CN); Jia Li, Shenzhen (CN); Huanxin Liu, Shenzhen (CN); Hongfei Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 14 days.

(21) Appl. No.: 16/932,585

(22) Filed: Jul. 17, 2020

(65) Prior Publication Data

US 2020/0351235 A1 Nov. 5, 2020

Related U.S. Application Data

(63) Continuation of application No. PCT/CN2019/078547, filed on Mar. 18, 2019.

(30) Foreign Application Priority Data

Apr. 20, 2018 (CN) .......................... 201810362776.6

(51) Int. Cl.
*H04L 29/12* (2006.01)
*H04L 9/06* (2006.01)
(Continued)

(52) U.S. Cl.
CPC .......... *H04L 61/103* (2013.01); *H04L 9/0637* (2013.01); *H04L 12/4641* (2013.01);
(Continued)

(58) Field of Classification Search
CPC ... G06F 15/16; G06F 15/173; H04L 63/0428; H04L 63/0227; H04L 45/20; H04L 63/20
See application file for complete search history.

(56) References Cited

U.S. PATENT DOCUMENTS

2010/0189117 A1 7/2010 Gowda et al.
2011/0320577 A1 12/2011 Bhat et al.
(Continued)

FOREIGN PATENT DOCUMENTS

CN 102387061 A 3/2012
CN 106789367 A 5/2017
(Continued)

OTHER PUBLICATIONS

Tencent Technology, ISR, PCT/CN2019/078547, May 20, 2019, 2 pgs.

(Continued)

*Primary Examiner* — Iqbal Zaidi
(74) *Attorney, Agent, or Firm* — Morgan, Lewis & Bockius LLP

(57) ABSTRACT

This application discloses a network communication method applied to a network communication system including a first network device in a first private network, a second network device in a second private network and a gateway device coupling the first private network to the second private network. The first network device receives a first data packet transmitted from a terminal to a target blockchain node, and acquires an actual network address of the target blockchain (Continued)

node; and generates a second data packet according to the first data packet and the actual network address, and transmits the second data packet to a virtual network address of the second network device in the second private network, so that the operation overheads generated when the gateway device generates virtual network addresses for blockchain nodes can be reduced, thereby saving a storage space of the gateway device.

20 Claims, 5 Drawing Sheets

(51) Int. Cl.
    *H04L 12/46* (2006.01)
    *H04L 12/66* (2006.01)
    *H04L 29/06* (2006.01)
    *H04L 61/103* (2022.01)
    *H04L 69/22* (2022.01)
(52) U.S. Cl.
    CPC .............. *H04L 12/66* (2013.01); *H04L 69/22* (2013.01); *H04L 2209/38* (2013.01)

(56) References Cited

U.S. PATENT DOCUMENTS

| 2018/0276663 A1* | 9/2018 | Arora .................. G06Q 20/065 |
| 2019/0018887 A1* | 1/2019 | Madisetti .............. H04L 9/3247 |
| 2019/0238412 A1* | 8/2019 | Vohra ...................... H04L 69/14 |

FOREIGN PATENT DOCUMENTS

| CN | 106850876 A | 6/2017 |
| CN | 107172120 A | 9/2017 |
| CN | 107465590 A | 12/2017 |
| CN | 107872542 A | 4/2018 |
| CN | 107911421 A | 4/2018 |
| CN | 108650182 A | 10/2018 |

OTHER PUBLICATIONS

Tencent Technology, WO, PCT/CN2019/078547, May 20, 2019, 4 pgs.
Tencent Technology, IPRP, PCT/CN2019/078547, Oct. 20, 2020, 5 pgs.

* cited by examiner

NETWORK COMMUNICATION METHOD AND SYSTEM, DEVICE, AND STORAGE MEDIUM

CROSS-REFERENCE TO RELATED APPLICATIONS

This application is a continuation application of PCT Patent Application No. PCT/CN2019/078547, entitled "NETWORK COMMUNICATION METHOD, SYSTEM AND DEVICE, AND STORAGE MEDIUM" filed on Mar. 18, 2019, which claims priority to Chinese Patent Application No. 201810362776.6, entitled "NETWORK COMMUNICATION METHOD, SYSTEM, AND APPARATUS, DEVICE, AND STORAGE MEDIUM" filed Apr. 20, 2018, all of which are incorporated by reference in their entirety.

FIELD OF THE TECHNOLOGY

This application relates to the field of network technologies, and in particular to a network communication method and system, a device, and a storage medium.

BACKGROUND OF THE DISCLOSURE

With the development of network technologies, people may customize a virtual private cloud (VPC) based on a cloud and arrange and manage their devices in the VPC. For example, a user may arrange a terminal in the VPC, and a service provider may arrange a blockchain node in the VPC. Each VPC is a relatively isolated network environment. To enable different VPCs to communicate with each other, a VPC gateway is arranged between VPCs. Devices in different VPCs may perform network communication by using the VPC gateway.

For example, a terminal is located in a VPC 1, and blockchain nodes in a blockchain system are located in a VPC 2. The VPC gateway generates a corresponding virtual network address for each blockchain node in the VPC 2 in advance, and stores a mapping relationship between a virtual network address and an actual network address of each blockchain node. In a case that the terminal needs to transmit a data packet to a blockchain node, the terminal transmits the data packet to a virtual network address of the blockchain node. The VPC gateway receives the data packet, searches the mapping relationship between a virtual network address and an actual network address of the blockchain node according to the virtual network address of the blockchain node to obtain an actual network address of the blockchain node, and transmits the data packet to the actual network address of the blockchain node, so that the blockchain node receives the data packet.

SUMMARY

Embodiments of this application provide a network communication method and system, a device, and a storage medium, to resolve the technical problem in the related art that a VPC gateway consumes excessive resources. The technical solution is as follows:

According to an aspect, a network communication method is provided, applied to a network communication system including a first network device in a first private network, a second network device in a second private network and a gateway device coupling the first private network to the second private network, the method including:

receiving, by the first network device, a first data packet transmitted from a terminal in the first private network to a target blockchain node in the second private network;

acquiring, by the first network device, an actual network address of the target blockchain node, the actual network address being an intranet address of the target blockchain node in the second private network;

generating, by the first network device, a second data packet according to the first data packet and the actual network address, the second data packet carrying the first data packet and the actual network address; and transmitting, by the first network device, the second data packet to a virtual network address of the second network device in the second private network, the virtual network address being used for the gateway device to forward a received data packet including the second data packet to the second network device.

According to another aspect, a network communication system is provided, including a first network device in a first private network, a second network device in a second private network, and a gateway device coupling the first private network to the second private network;

the first network device being configured to: receive a first data packet transmitted from a terminal in the first private network to a target blockchain node in the second private network; acquire an actual network address of the target blockchain node, the actual network address of the target blockchain node being an intranet address of the target blockchain node in the second private network; generate a second data packet according to the first data packet and the actual network address, the second data packet carrying the first data packet and the actual network address; and transmit the second data packet to a virtual network address of the second network device;

the gateway device being configured to: search a third mapping relationship between a virtual network address and an actual network address according to the virtual network address of the second network device, to obtain an actual network address corresponding to the virtual network address as an actual network address of the second network device; and transmit the second data packet to the actual network address of the second network device; and the second network device being configured to: receive the second data packet of the gateway device; acquire the actual network address of the target blockchain node from the second data packet; and transmit the second data packet to the actual network address of the target blockchain node according to the actual network address.

According to another aspect, a non-transitory computer-readable storage medium is provided, storing at least one instruction, the instruction being loaded and executed by a network communication system comprising a first network device in a first private network, a second network device in a second private network, and a gateway device coupling the first private network to the second private network, wherein the first network device, the second network device, and the gateway device are configured to perform the aforementioned network communication method.

The beneficial effects brought by the technical solutions provided in the embodiments of this application are at least as follows: By means of the method and system, the device, and the storage medium provided in the embodiments of this application, a first network device adds an actual network address of a target blockchain node to a data packet transmitted to the target blockchain node, and transmits the data packet to a virtual address of a second network device, so that the data packet can be forwarded to the target blockchain node by using a gateway device and the second network device. Therefore, on the basis of satisfying a requirement that a terminal in a first private network and separately communicates with blockchain nodes in a second private network, the gateway device does not need to separately generate a virtual network address for each blockchain node, thereby greatly saving processing resources of the gateway device, reducing operation overheads of the gateway device, and saving a storage space of the gateway device, so as to ensure the normal operation of the gateway device.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

Figure 1:
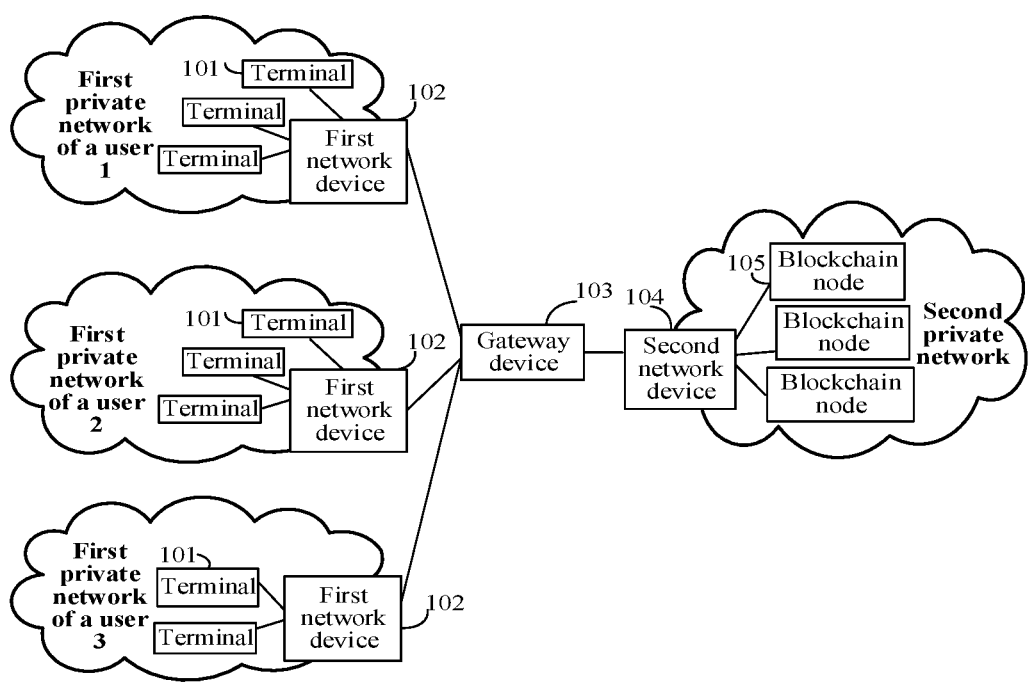
FIG. 1 is a schematic diagram of an implementation environment of a network communication method according to an embodiment of this application.

The technical solutions in the embodiments of the present application are clearly described in the following with reference to the accompanying drawings. Apparently, the embodiments to be described are merely a part rather than all of the embodiments of the present application. All other embodiments obtained by persons of ordinary skill in the art based on the embodiments of this application without creative efforts shall fall within the protection scope of this application.

For distinguishing and description, in the embodiments of this application, for example, a data packet generated by a terminal during communication is referred to as a first data packet, a data packet generated by combining the first data packet with an actual network address of a second network device is referred to as a second data packet, a VPC in which the terminal is located is referred to as a first private network, a VPC in which a blockchain node is located is referred to as a second private network, a mapping relationship between a mapping port of the blockchain node and an actual network address of the blockchain node is referred to as a first mapping relationship, a mapping relationship between a user identifier and a blockchain node is referred to as a second mapping relationship, and a mapping relationship between a virtual network address and an actual network address of the second network device is referred to as a third mapping relationship.

The terms such as "first", "second", and "third" are used only for distinguishing between and describing different data packets, different private networks, and different mapping relationships, and is not to be understood as indicating or implying the order relationship or relative importance or implicitly specifying the number of the indicated technical features.

For ease of understanding, the technical terms "VPC" and "blockchain" used in the embodiments of this application are described first:

A VPC is a network environment that can be customized as required. In the VPC, a user may flexibly divide network segments and formulate a routing policy. The VPC may be a private network on a cloud.

Different devices in one same VPC may perform intranet communication. Specifically, in a possible embodiment, the implementation of performing intranet communication by different devices in one same VPC may be as follows: For any VPC, the VPC may have at least one intranet network segment. Each device in the VPC may have one intranet Internet Protocol (IP) address in an intranet network segment. Any two devices in the VPC may communicate by using respective intranet IPs. For example, a device A and a device B may communicate by using an intranet IP 1 of the device A and an intranet IP 2 of the device B. In a possible implementation, a network device may be deployed in the VPC. The network device may be a router or a switch. The switch may forward a data packet between different devices in one same subnet in one same VPC based on a data link layer protocol. The router may forward a data packet between devices in different subnets in one same VPC based on a network layer protocol.

The VPC is an isolated network environment. Specifically, direct communication cannot be performed between different VPCs, between a VPC and an Ethernet, and between a VPC and a private network other than the VPC. Specifically, in a possible embodiment, for any device in any VPC, a data packet of the device needs to be forwarded by a gateway device to be transmitted to a VPC other than the VPC, an Ethernet or a private network other than the VPC. Similarly, for a VPC other than the VPC, an Ethernet or a private network other than the VPC, a data packet of any device in these networks needs to be forwarded by a gateway device to be transmitted to the device in the VPC. In this way, the function of tenant isolation can be implemented to ensure the safety of user data.

A blockchain is a decentralized distributed database and is a novel application mode based on technologies such as peer to peer (P2P) network transmission, a consensus mechanism, and an encryption algorithm. The blockchain stores and verifies data by using a chain data structure, the encryption algorithm is used to ensure the safety of data transmission and search, and the data is operated by using a smart contract. The smart contract is a contract program that is automatically executed according to a specific condition, and is an important approach for implementing service logic by using a blockchain.

FIG. 1 is a schematic diagram of an implementation environment of a network communication method according to an embodiment of this application. The implementation environment includes a plurality of terminals 101, a first network device 102, a gateway device 103, a second network device 104, and a plurality of blockchain nodes 105.

The plurality of terminals 101 and the first network device 102 are located inside a first private network. Each terminal 101 may communicate with a device located outside the first private network by using the first network device 102.

Specifically, in a possible embodiment, in a case that the terminal 101 needs to transmit a data packet to the device outside the first private network, the terminal 101 may transmit the data packet to the first network device 102. The first network device 102 may receive the data packet, and forward the data packet to the device outside the first private network. Similarly, in a case that the device outside the first private network needs to transmit a data packet to the terminal 101, the device outside the first private network may transmit the data packet to the first network device 102, and the first network device 102 may receive the data packet and forward the data packet to the terminal 101.

The plurality of blockchain nodes 105 and the second network device 104 are located in a second private network, and each blockchain node 105 may communicate with a device located outside the second private network by using the second network device 104.

Specifically, in a possible embodiment, in a case that a blockchain node 105 needs to transmit a data packet to the device outside the second private network, the blockchain node 105 may transmit the data packet to the second network device 104. The second network device 104 may receive the data packet, and forward the data packet to the device outside the second private network. Similarly, in a case that the device outside the second private network needs to transmit a data packet to the blockchain node 105, the device outside the second private network may transmit the data packet to the second network device 104, and the second network device 104 may receive the data packet and forward the data packet to the blockchain node 105.

The first network device 102 and the second network device 104 may communicate by using the gateway device 103 to implement information exchange between the first private network and the second private network.

The first network device 102, the second network device 104, and the gateway device 103 may all be routers, switches, gateway devices, firewall devices, servers or the like. The terminal 101 may be a personal computer, a mobile phone, a load balancer or the like. The blockchain node may be a server, a personal computer, a laptop computer or another electronic device with a computing capability. Each device in the foregoing implementation environment may be a physical device or may be a logical virtual device, for example, may be a virtual machine or container, for example, is a virtual part of a cloud platform. This is not limited in this embodiment.

To make the advantages of this application more comprehensible, one exemplary application scenario is used in combination for description below:

For example, the terminal is located in a VPC 1, and a target blockchain node is located in a VPC 2. The terminal has a requirement of crossing the VPC 1 in which the terminal is located to transmit a data packet to the target blockchain node in the VPC 2. For example, a user operates the terminal to generate a transaction. The terminal generates ledger data according to an amount, an account, and the like of the transaction and intends to transmit the ledger data to a blockchain node, so that the target blockchain node records the ledger data in the blockchain. Therefore, the terminal generates a data packet and adds the ledger data to a packet body of the data packet, and needs to transmit the data packet to the blockchain node, so that the blockchain node obtains the ledger data from the data packet.

Because the VPC 1 and the VPC 2 are isolated from each other, the terminal in the VPC 1 cannot directly transmit the data packet to the target blockchain node in the VPC 2 by using an intranet IP of the terminal in the VPC 1. Instead, a gateway device needs to be arranged between the VPC 1 and the VPC 2. The gateway device is configured to open a communication channel between the VPC 1 and the VPC 2 to transmit the data packet from the VPC 1 to the VPC 2.

In the related art, for each user, the gateway device needs to generate a virtual network address corresponding to each blockchain node for each blockchain node associated with the user, for example, allocate one virtual IP address and virtual port number to each blockchain node. Different blockchain nodes correspond to different virtual network addresses, so that different virtual network addresses are used to distinguish between different blockchain nodes. Therefore, every time one user is added to a blockchain system, a VPC gateway needs to generate a large number of virtual network addresses for a large number of blockchain nodes, and every time the user is newly associated with one or more blockchain nodes, the VPC gateway also needs to generate a corresponding virtual network address for each newly associated blockchain node.

However, as a basic part of the cloud platform, the VPC gateway has limited processing resources and a limited storage space and therefore cannot adequately include excessively complex service logic. If the VPC gateway generates and stores massive virtual network addresses, the normal operation of the VPC gateway faces great challenge. Because a total quantity of virtual network addresses that one VPC gateway can generate is limited and the quantity of virtual network addresses affects a quantity of blockchain nodes that can be held in the communication system, in this manner, the quantity of blockchain nodes that can be held in the communication system is limited.

During the application of the network communication method and the system provided in the embodiments of this application, the first network device may be arranged in the VPC 1, and the second network device may be arranged in the VPC 2. The gateway device can implement a forwarding function of a data packet by generating a virtual network address for the second network device and storing a mapping relationship between a virtual network address and an actual network address, but does not need to generate a virtual network address for each blockchain node, and also does not need to store the mapping relationship between a virtual network address and an actual network address for each blockchain node.

Specifically, in a case that a terminal in the VPC 1 needs to transmit a data packet to each blockchain node in the VPC 2, the terminal can transmit the data packet to the first network device. The first network device may add an actual network address of a corresponding blockchain node to the data packet, and transmit the data packet carrying the actual network address to the virtual network address of the second network device. The gateway device can receive the data packet according to the virtual network address of the second network device, search the mapping relationship between a virtual network address and an actual network address to obtain the actual network address of the second network device, and forward the data packet transmitted to each blockchain node to the second network device according to the actual network address of the second network device. The second network device can receive the data packet of each blockchain node in the second private network, and can transmit each data packet to a corresponding blockchain node according to the actual network address in each data packet.

In this way, the multi-point communication between a plurality of terminals and the plurality of blockchain nodes is converted into point-to-point communication between the first network device and the second network device. On the basis of satisfying a requirement that each terminal in the VPC 1 communicates with each blockchain node in the VPC 2, processing resources of the gateway device are greatly saved, operation overheads of the gateway device are reduced, and a storage space of the gateway device is saved, so as to ensure the normal operation of the gateway device. Furthermore, because the restriction of limited resources of the gateway device is removed, a total quantity of users that the blockchain system can serve is increased, so that the blockchain system can simultaneously support the access of a large quantity of users on a cloud, and each user may develop a respective blockchain-based application on a blockchain platform of the cloud.

Figure 2:
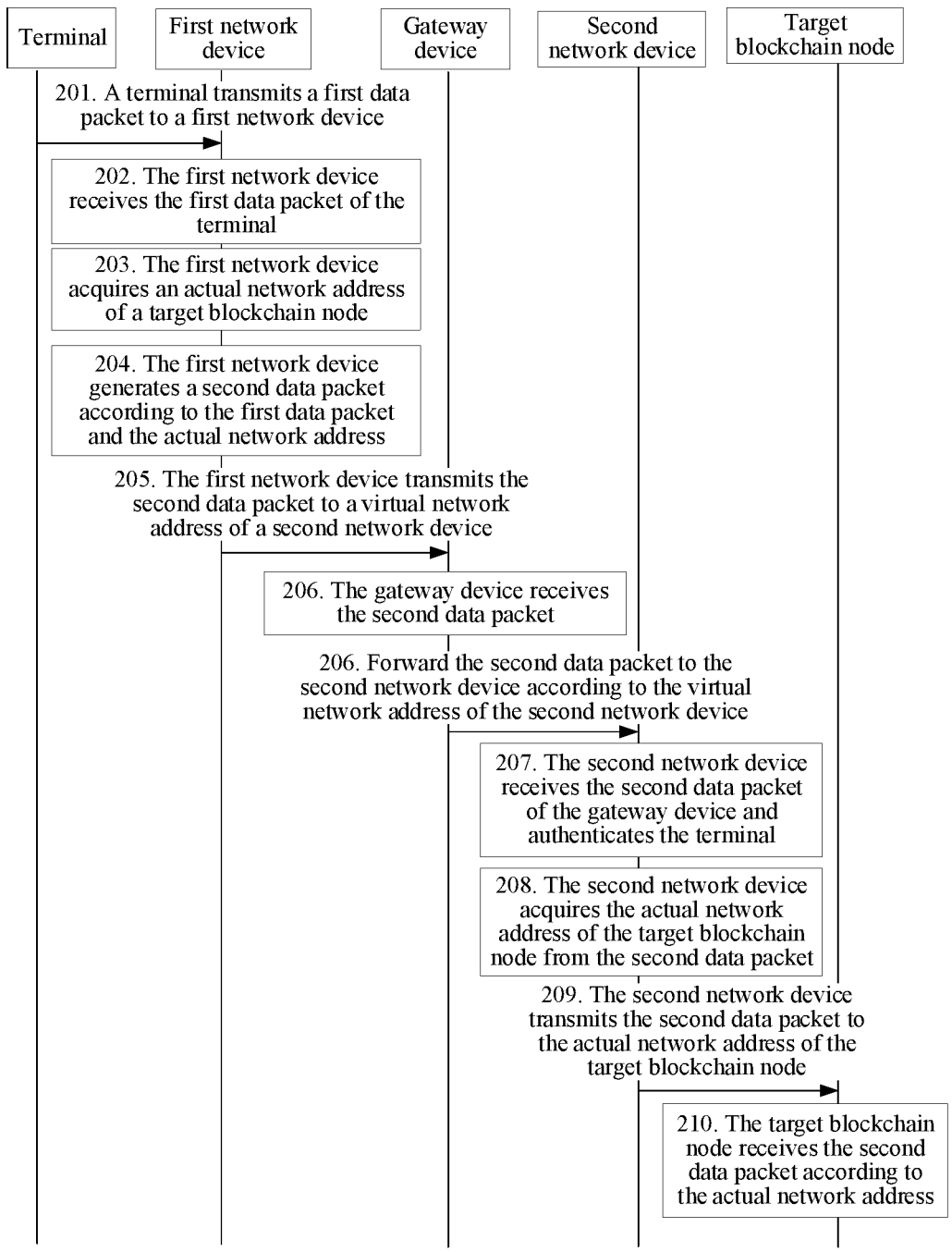
FIG. 2 is a flowchart of a network communication method according to an embodiment of this application.

FIG. 2 is a flowchart of a network communication method according to an embodiment of this application. The method is performed by a terminal, a first network device, a second network device, a gateway device, and a target blockchain node. Referring to FIG. 2, the method includes the following steps:

201. The terminal in a first private network transmits a first data packet to the first network device.

In a case that the terminal in the first private network needs to transmit data to a target blockchain node in a second private network, the terminal may generate the first data packet, and transmit the first data packet to the first network device, so that the first data packet is transmitted to the target blockchain node by using the first network device. A source device of the first data packet is the terminal, and a destination device of the first data packet is the target blockchain node in the second private network.

Specifically, a source IP address and a source port number of the first data packet may be an IP address and a port number of the terminal, and a destination IP address and a destination port number of the first data packet may be an IP address and a port number of the target blockchain node.

In an exemplary scenario, after completing a transaction event, for example, a process such as transfer, product delivery, and information intercommunication with an operational entity, the terminal may generate the first data packet. The first data packet includes transaction data. The transaction data may include at least one of identifiers of both transaction parties, a transaction amount, and a transaction time of the transaction event. The terminal may transmit the first data packet to the first network device, so that the target blockchain node may acquire the transaction data from the second data packet after receiving the second data packet generated according to the first data packet, and record the transaction data by using a blockchain. For example, the target blockchain node may generate a block according to the transaction data. In a case that at least one blockchain node in the second private network reaches a consensus on the block, the block is added to the blockchain.

In a possible design, a process of transmitting the first data packet may be implemented in a port mapping manner. Specifically, at least one blockchain node in a blockchain system may be mapped in advance to at least one mapping port in the first network device. Each blockchain node corresponds to each mapping port. Different mapping ports can be used to distinguish between different blockchain nodes. The terminal may generate the first data packet according to a mapping port corresponding to the target blockchain node and a network address of the first network device, and transmit the first data packet to the first network device.

In combination with a port mapping manner, for a transmission attribute of the first data packet, a destination port of the first data packet may be a mapping port corresponding to the target blockchain node, so that the target blockchain node to which the first data packet needs to be redirected can be identified by using the destination port of the blockchain node. In addition, a destination address of the first data packet may be the network address of the first network device, so that the first data packet can be transmitted to the first network device by using the destination address of the first data packet.

In a possible implementation, the first data packet may indicate the destination port and the destination address by using a packet header. For example, the packet header may carry a destination port number and a destination IP address. The destination port number indicates the destination port, and the destination IP address indicates the destination address. In the packet header of the first data packet, the destination port number may be a mapping port number of the mapping port corresponding to the target blockchain node, and the destination IP address may be the network address of the first network device. In addition, in the packet header of the first data packet, the source IP address may be an IP address of the terminal, and the source port number may be a port number of the terminal, and the source IP address and the source port number may indicate that the first data packet is from the terminal.

In a port mapping manner, the terminal adds, to each data packet, a mapping port number of a blockchain node to which a data packet is to be transmitted, so that different mapping port numbers may be used to distinguish between data packets to be transmitted to different blockchain nodes, so as to transmit each data packet to a corresponding blockchain node, thereby eventually satisfying a requirement of transmitting a data packet to each blockchain node.

202: The first network device receives the first data packet of the terminal.

The first network device has the function of forwarding a data packet and may receive the first data packet transmitted by the terminal and forward the first data packet to the target blockchain node. For a process of receiving the first data packet by the first network device, optionally, the first network device may turn on the mapping port corresponding to the target blockchain node in advance to listen to the mapping port corresponding to the target blockchain node, and receive the first data packet in the process of listening to the mapping port corresponding to the target blockchain node.

For a specific implementation of listening to the mapping port corresponding to the target blockchain node, in a case that the first network device receives any data packet, the first network device may determine a destination port of the data packet, and determine whether the destination port of the data packet is the mapping port corresponding to the target blockchain node. In a case that the destination port of the data packet is the mapping port corresponding to the target blockchain node, the first network device determines that the first data packet to be transmitted to the target blockchain node is received, and subsequently processing logic of generating the second data packet according to the first data packet is executed. In a case that the destination port of the data packet is not the mapping port corresponding to the blockchain node, other processing logic may be executed. For example, the data packet is forwarded to another device.

Specifically, for the process of determining the destination port of the data packet by the first network device, the first network device may parse the packet header of the data packet to obtain a destination port number carried in the packet header of the data packet, and determine a port corresponding to the destination port number as the destination port of the data packet. For the process of determining whether the destination port of the data packet is the mapping port corresponding to the blockchain node, the first network device may store mapping port information. The mapping port information includes a mapping port number of each mapping port that is currently listened to and corresponds to the blockchain node. The first network device may determine whether a destination port number of the data packet belongs to mapping port information. In a case that the destination port number belongs to the mapping port information, it is determined that the destination port of the data packet is the mapping port corresponding to the blockchain node.

Optionally, the first network device may listen to each mapping port corresponding to each blockchain node in the blockchain system, and different blockchain nodes may correspond to different mapping ports. In this way, the first network device can recognize and distinguish between, according to mapping ports corresponding to the first data packet, blockchain nodes to which the first data packet is to be transmitted.

For example, a manner of listening to each mapping port corresponding to each blockchain node may be similar to the foregoing manner of listening to the mapping port corresponding to the target blockchain node. For example, assuming that the blockchain system includes N blockchain nodes, N mapping ports may be turned on, and the N mapping ports are listened to, and each of the N mapping ports corresponds to one of the N blockchain nodes, where N is a positive integer.

203: The first network device acquires an actual network address of the target blockchain node.

An actual network address of a blockchain node is an intranet address of the blockchain node in the second private network, and a corresponding blockchain node can be uniquely determined in the second private network. Therefore, the actual network address of the blockchain node is carried in a data packet, and the data packet is forwarded to the second network device. The second network device can forward the received data packet to the corresponding blockchain node in the second private network according to the actual network address of the blockchain node. For example, the actual network address of the blockchain node may include an IP address and a port number of the blockchain node. The IP address may be an intranet IP of the blockchain node in the second private network, and the port number may identify a port processing a service in the blockchain node.

To enable the second network device to determine a blockchain node to which the first data packet is to be forwarded, the first network device may acquire the actual network address of the target blockchain node, and add the actual network address to the first data packet. In this way, the second network device may determine, according to the actual network address in the data packet, that the destination device of the first data packet is the target blockchain node, so as to forward the first data packet to the target blockchain node.

The acquisition of the actual network address of the target blockchain node may be specifically implemented by using the following step 1 and step 2:

Step 1: The first network device acquires the mapping port number carried in the first data packet.

For example, in a case that the first network device uses a manner of listening to a mapping port, a data packet transmitted to a blockchain node is received, and the first network device may determine a mapping port to which the first network device listens to obtain the first data packet, and the mapping port is used as the mapping port corresponding to the first data packet. In a case that the first network device receives a data packet without using a manner of listening to a mapping port, the first network device may determine the destination port of the first data packet, and use the destination port of the first data packet as the mapping port corresponding to the first data packet. For example, the first network device may parse the packet header of the first data packet to obtain a destination port number carried in the packet header and determine a port corresponding to the destination port number as the mapping port of the first data packet.

Step 2: The first network device searches a first mapping relationship between a mapping port number of a blockchain node and an actual network address, to obtain an actual network address corresponding to the mapping port number, and uses the actual network address corresponding to the mapping port number as the actual network address of the target blockchain node.

The first mapping relationship may be referred to as a port mapping relationship. The first mapping relationship may include at least one mapping port number corresponding to a blockchain node and an actual network address of the at least one blockchain node.

For a manner of obtaining the first mapping relationship by the first network device, the first mapping relationship may be stored in an Operations Support System (OSS) of a blockchain. The second network device may acquire a correspondence between a user identifier and a blockchain node set from the OSS. For example, the first network device may actively pull the first mapping relationship from the OSS of the blockchain. For example, the first network device may transmit a mapping relationship request to the OSS. After receiving the mapping relationship request, the OSS may generate a mapping relationship response, and transmit the mapping relationship response to the first network device. The first network device acquires the first mapping relationship from the mapping relationship response. The mapping relationship response includes the first mapping relationship. For another example, the OSS of the blockchain may push the first mapping relationship to the first network device. For example, in a case that the first network device performs initialization and registers with the OSS, the OSS may push the first mapping relationship to the first network device. In addition, the second network device may alternatively prestore the first mapping relationship. In addition, a configuration operation may be alternatively performed on the first network device, and the first network device receives the configured first mapping relationship.

204: The first network device generates the second data packet according to the first data packet and the actual network address.

The second data packet carries the first data packet and the actual network address of the target blockchain node. Therefore, the second data packet includes the content of the first data packet and can also indicate the actual network address of the target blockchain node, and the first network device generates the second data packet including the first data packet, so that in one aspect, the blockchain node can receive the first data packet transmitted by the terminal, and in another aspect, the first data packet can be eventually routed to the target blockchain node in the second private network.

For a process of generating the second data packet, the first network device may add the actual network address of the target blockchain node to the first data packet, and use the first data packet carrying the actual network address as the second data packet. In a possible implementation, a process of generating the second data packet may include the following step 1 and step 2:

Step 1: The first network device generates a redirection packet header carrying the actual network address.

The redirection packet header is used for redirecting the second data packet from the second network device to the target blockchain node. The redirection packet header carries the actual network address of the target blockchain node. For example, the destination address in the redirection packet header may be the actual IP address in the target blockchain node, and the destination port number in the redirection packet header may be a port number of a port processing a service in the blockchain node.

Optionally, content other than the destination address and destination port number in the redirection packet header may be the same as the packet header of the first data packet. For example, the source IP address of the redirection packet header may be an IP address of the terminal. The source port number may be a port number of the terminal, so as to indicate that the second data packet is actually from the terminal. In addition, the content other than the destination address and destination port number in the redirection packet header may be alternatively determined according to information of the first network device. For example, the source IP address of the redirection packet header may be an IP address of the first network device, and the source port number may be a port number of the first network device, so as to indicate that the second data packet has been forwarded by the first network device.

Step 2: The first network device adds the redirection packet header to the first data packet, to obtain the second data packet.

The second network device has the function of processing a data packet and can add the redirection packet header to the first data packet. For example, the second network device may encapsulate the redirection packet header in front of the packet header of the first data packet, and use a combination of the first data packet and the redirection packet header as the second data packet. In this way, the second data packet may include two packet headers. One packet header is originally generated by the terminal, and the other packet header is the redirection packet header generated by the first network device. For another example, the second network device may replace the packet header of the first data packet with the redirection packet header, that is, remove the packet header of the first data packet from the first data packet, encapsulate the redirection packet header again, and then use the first data packet with the packet header replaced as the second data packet. In this way, the packet header in the second data packet is the redirection packet header generated by the first network device.

By using the foregoing step 1 and step 2, the first network device adds the redirection packet header, so that the second data packet can be redirected to the target blockchain node at the second network device, so as to be forwarded to the target blockchain node, thereby satisfying a requirement of transmitting a data packet.

205: The first network device transmits the second data packet to a virtual network address of the second network device.

The virtual network address of the second network device is an address allocated by the gateway device to the second network device, and may be generated by the gateway device in advance according to an actual network address of the second network device. The virtual network address of the second network device may include the virtual IP address and the virtual port number. The virtual network address of the second network device is used for the gateway device to forward the received data packet to the second network device. That is, during the transmission of a data packet to the virtual network address of the second network device, the data packet reaches the gateway device, and the data packet is forwarded by the gateway device to the second network device.

In combination with the function of the virtual network address of the second network device, the first network device acquires the virtual network address of the second network device, and transmits the second data packet to the virtual network address of the second network device, so that the second data packet may reach the second network device through the gateway device, so as to break the network isolation between the first private network and the second private network to perform communication with the second network device. A manner of acquiring the virtual network address of the second network device by the first network device is similar to the foregoing manner of acquiring the first mapping relationship. Details are not described herein.

In this embodiment, the first network device implements the function of a forwarding agent by using the foregoing step, and the first network device may be referred to as a forwarding agent device. The first network device acts as an agent of the terminal to perform the task of transmitting the data packet to blockchain nodes. The terminal only needs to transmit data packets of the blockchain nodes to the first network device. The first network device adds actual addresses of blockchain nodes to achieve the effect of transmitting data packets to the blockchain nodes. That is, the terminal only needs to access the first network device to satisfy a requirement of performing communication with the blockchain nodes in the blockchain system.

Figure 3:
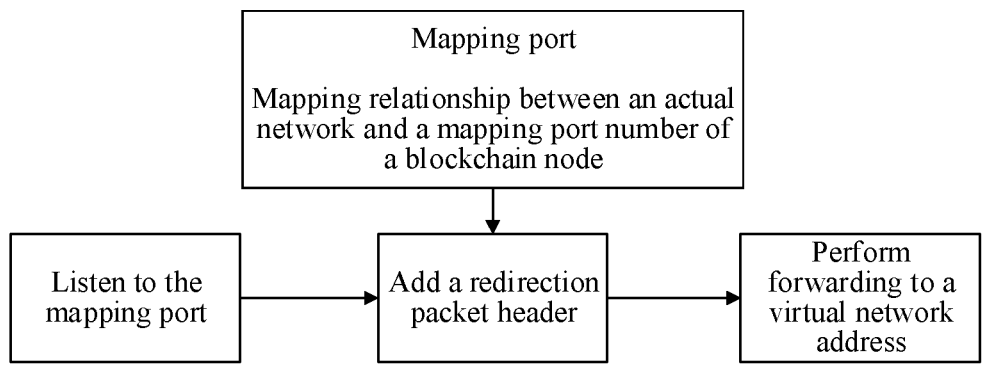
FIG. 3 is a schematic diagram of the function of a network device according to an embodiment of this application.

FIG. 3 is a structural diagram of the function of the first network device. The first network device may have various functions such as port listening, addition of a redirection packet header, and forwarding to a virtual network address. By means of the function of port listening, the first data packet can be received in a process of listening to a mapping port. By means of the function of the redirection packet header, an actual network address to which the first data packet needs to be redirected can be marked. By means of the function of forwarding to the virtual network address, the first data packet can be forwarded to the second network device.

206: The gateway device receives the second data packet, and forwards the second data packet to the second network device according to the virtual network address of the second network device.

For the process of receiving the second data packet by the gateway device, the gateway device may set a network address of receiving the data by the gateway device as the virtual network address of the second network device.

Therefore, in a case that the first network device transmits the second data packet to the virtual network address of the second network device, the gateway device can receive the second data packet.

For the process of forwarding the second data packet, the gateway device may store a third mapping relationship between a virtual network address and an actual network address of the second network device. After receiving the second data packet, the gateway device may search the third mapping relationship according to the virtual network address of the second network device, to obtain the actual network address of the second network device from the third mapping relationship, and transmit a data packet to the actual network address of the second network device, so as to forward the second data packet to the second network device. The actual network address of the second network device may include an internet IP address of the second network device and a port number of a port receiving a data packet in the second network device.

In this embodiment, the gateway device maps the actual network address of the second network device to the virtual network address. The virtual network address can be accessed by the first network device and the terminal in the first private network. The actual network address can be routed to the second network device in the second private network. The gateway device may forward a data packet from the first private network to the second network device of the second private network according to the third mapping relationship between a virtual network address and an actual network address, so as to open a communication channel between the first private network and the second private network and implement a communication function across private networks.

207: The second network device receives the second data packet of the gateway device and authenticates the terminal.

Optionally, the second network device may have an authentication function and may check whether the terminal has the right to access the target blockchain node. In a case that the terminal has the right to access the target blockchain node, the second network device transmits the second data packet to the target blockchain node. In a case that the terminal does not have the right to access the target blockchain node, the second network device may refuse to transmit the second data packet to the target blockchain node, for example, may discard the second data packet. For another example, the gateway device may be used to return a retransmission failure message to the terminal, so as to control the right of the terminal to transmit a data packet to a blockchain node.

In a possible implementation, the process of authentication may be implemented based on a second mapping relationship between a user identifier and a blockchain node. That is, each user identifier only has the right to access a corresponding blockchain node in the second mapping relationship but does not have the right to access another blockchain node. The second mapping relationship may include at least one user identifier and at least one corresponding blockchain node. The second mapping relationship may be determined according to a service requirement. For example, for a user identifier that registers a ledger service, the blockchain node corresponding to the user identifier may be one or more blockchain nodes associated with a bank. The second mapping relationship may be one list, array or set, and may certainly be represented by using another data structure in a program language. A process of acquiring the second mapping relationship by the second network device is similar to a process of acquiring the first mapping relationship by the first network device. Details are not described herein.

A specific process of performing authentication based on the second mapping relationship may include the following step 1 to step 4:

Step 1: The second network device acquires the user identifier carried in the second data packet.

The second network device may parse the second data packet, to obtain the user identifier carried in the second data packet. The second network device may parse the redirection packet header of the second data packet to obtain the user identifier from the redirection packet header. Alternatively, the second network device may parse the packet header of the first data packet in the second data packet, to obtain the user identifier from the packet header of the first data packet.

Step 2: The second network device obtains at least one blockchain node corresponding to the user identifier from the second mapping relationship according to the second mapping relationship between a user identifier and a blockchain node.

The second network device may acquire the second mapping relationship, and search the second mapping relationship by using the user identifier carried in the second data packet as an index, so as to obtain at least one blockchain node corresponding to the user identifier.

Step 3: The second network device determines whether the target blockchain node belongs to at least one blockchain node corresponding to the user identifier.

The second network device performs the following step 4 in a case that the target blockchain node belongs to at least one blockchain node corresponding to the user identifier. The second network device performs the following step 5 in a case that the target blockchain node does not belong to at least one blockchain node corresponding to the user identifier.

Step 4: The second network device determines that the terminal has the right to access the target blockchain node in a case that the target blockchain node belongs to at least one blockchain node corresponding to the user identifier, so that the authentication succeeds, and the second network device performs the following step 208.

Step 5: The second network device determines that the terminal does not have the right to access the target blockchain node in a case that the target blockchain node does not belong to at least one blockchain node corresponding to the user identifier, so that the authentication fails, and the second network device refuses to forward the second data packet to the target blockchain node.

In this step, the second network device checks the right of the terminal to access the target blockchain node, and forwards a data packet to the target blockchain node in a case that the authentication succeeds, so that the communication safety of the blockchain node can be ensured, so as to prevent an unlawful user from infiltrating the blockchain node.

208: The second network device acquires the actual network address of the target blockchain node from the second data packet.

The second network device may have the function of redirecting a data packet, and can separately redirect data packets transmitted to the second network device to corresponding blockchain nodes in the blockchain system. Therefore, after receiving the second data packet, the second network device can use the redirection function to forward the second data packet to the target blockchain node according to the actual network address of the target blockchain node in the second data packet.

For a manner of acquiring the actual network address from the second data packet, the second network device may parse the second data packet, to obtain the actual network address of the target blockchain node carried in the second data packet, so as to obtain the actual network address added by the first network device in the foregoing step 204. In a case that the first network device adds the redirection packet header in the foregoing step 204, the second network device may parse the redirection packet header in the second data packet, to obtain the actual network address carried in the redirection packet header.

209: The second network device transmits the second data packet to the actual network address of the target blockchain node.

The actual network address of the target blockchain node is an intranet address of the target blockchain node in the second private network. The actual network address of the target blockchain node is prestored in the second network device and the target blockchain node, and the target blockchain node can be identified in the second private network. After the second network device transmits the second data packet to the actual network address of the target blockchain node, the target blockchain node may receive the second data packet.

For a specific implementation of transmitting the second data packet, Implementation 1 and Implementation 2 are provided herein as examples:

Implementation 1: The second network device forwards the second data packet to the target blockchain node.

The second network device may have the function of a transparent transmission. In the transparent transmission, a data packet is received and forwarded to a destination device of a data packet without processing. After receiving the second data packet, the second network device may use the function of transparent transmission and does not process the second data packet, but instead forwards the second data packet to the target blockchain node.

Implementation 2: The second network device processes the second data packet, and forwards the processed second data packet to the target blockchain node.

For example, the second network device may delete the redirection packet header from the second data packet to obtain the first data packet, and transmit the first data packet to the target blockchain node.

For another example, the second network device may delete the packet header of the first data packet from the first data packet, and transmit a combination of the redirection packet header and a packet body of the first data packet to the target blockchain node. For example, the second network device may encapsulate the redirection packet header and the packet body of the first data packet. A packet header of the encapsulated data packet is the redirection packet header, and a packet body of the encapsulated data packet is the packet body of the first data packet. The second network device may use the encapsulated data packet as the processed second data packet, and transmit the encapsulated data packet to the target blockchain node.

For another example, the second network device may change the mapping port number of the target blockchain node in the second data packet to the actual network address of the target blockchain node, and the changed second data packet is transmitted to the target blockchain node. For example, the second network device may store a fourth mapping relationship between a mapping port number of the target blockchain node and an actual network address of the target blockchain node. After receiving the second data packet, the second network device may acquire the mapping port number of the target blockchain node from the second data packet, and search the fourth mapping relationship according to the mapping port number of the target blockchain node, to obtain the actual network address of the target blockchain node corresponding to the mapping port number of the target blockchain node.

The specific logic of processing the second data packet by the second network device may be determined according to an actual service requirement. This is not limited in this embodiment.

In this implementation, the second network device may implement the function of a transparent agent. After the second network device processes the second data packet and the target blockchain node receives the second data packet, a source address of the second data packet is recognized as a network address of the terminal and a destination address is a network address of the target blockchain node. Therefore, no difference between the redirected second data packet and a data packet directly transmitted by the terminal is perceived. That is, the target blockchain node does not need to perceive the presence of the first network device, the second network device, and the gateway device. The first network device, the second network device, and the gateway device are transparent to the target blockchain node.

210: The target blockchain node receives the second data packet according to the actual network address.

The target blockchain node may receive the second data packet, and perform service processing according to the second data packet. For example, the content of the second data packet is ledger data. The target blockchain node may parse the second data packet to obtain the ledger data, the ledger data is recorded in a blockchain, and the ledger data is synchronized to other blockchain nodes in the blockchain system.

In the method provided in this embodiment, the first network device adds an actual network address of a target blockchain node to a data packet transmitted to the target blockchain node, and it is only necessary to transmit the data packet to a virtual address of the second network device, so that the data packet can be forwarded to the target blockchain node by using a gateway device and the second network device. Therefore, on the basis of satisfying a requirement that the terminal in a first private network and separately communicates with blockchain nodes in a second private network, the gateway device does not need to generate the virtual network address for each blockchain node, thereby greatly saving processing resources of the gateway device, reducing operation overheads of the gateway device, and saving a storage space of the gateway device, so as to ensure the normal operation of the gateway device.

A process in which the terminal exchanges information with a target blockchain node is described in the foregoing embodiment in FIG. 2. However, before this process, network configuration may be performed on the devices in advance, and the network configuration is used to open a channel of network communication, so that the devices implement the foregoing embodiment in FIG. 2 on the basis that configuration is completed.

A process of network configuration is described below in detail by using the embodiment in FIG. 4.

Figure 4:
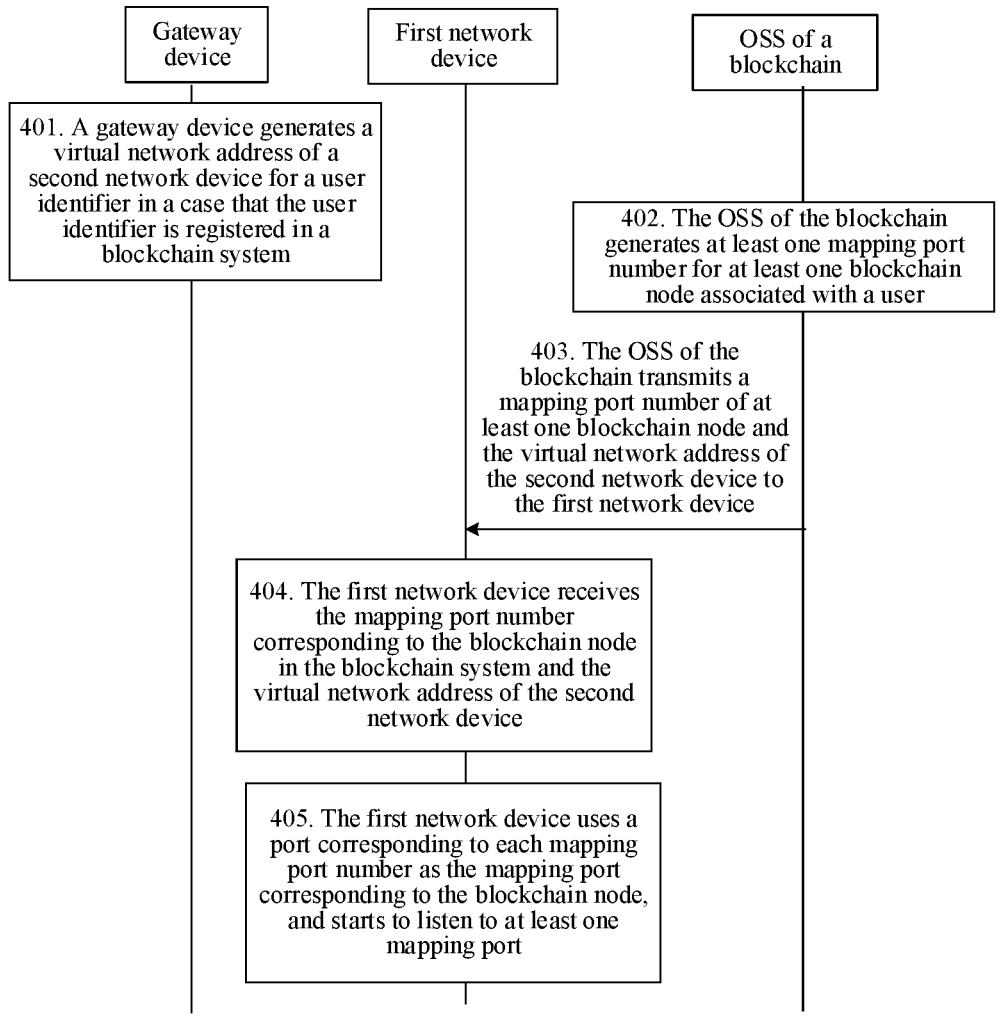
FIG. 4 is a flowchart of a network communication method according to an embodiment of this application.

FIG. 4 is a flowchart of a network communication method according to an embodiment of this application. Referring to FIG. 4, the method is performed by a gateway device, an OSS of a blockchain, and a first network device. The method includes the following steps:

401: The gateway device generates a virtual network address of a second network device for a user identifier in a case that the user identifier is registered in a blockchain system.

This step is described by using a scenario in which a new user is registered in the blockchain system as an example. That is, the user registers with the blockchain system and requests a blockchain node in the blockchain system to provide a service for the user. For example, the user registers with a financial application and requests the blockchain system associated with the financial application to record ledger data of every transaction for the user.

For a manner of acquiring a registered user identifier by the gateway device, a terminal may generate a user identifier registration request, and transmit the user identifier registration request to the gateway device. The gateway device may receive the user identifier registration request of the terminal. The user identifier registration request is used for requesting to register a user identifier of a new user in the blockchain system. A network device may obtain the user identifier from the user identifier registration request and determine that the user identifier is added to the blockchain system. The user identifier is used for identifying a user of a private network, for example, may be used for identifying a developer or an administrator of a private network or another user having the right to perform communication in a private network. The user identifier may be a name, a phone number or the like of the user.

For a process of triggering the user identifier registration request, in a possible implementation, the OSS of the gateway device may detect an input operation to obtain an input user identifier and an actual network address of the second network device. The OSS of the gateway device generates the user identifier registration request according to the user identifier and the actual network address of the second network device, and transmits the user identifier registration request to the gateway device, so that the gateway device receives the user identifier registration request. The user identifier may be an identity (ID) of a VPC of a user. In another possible implementation, the terminal may transmit the user identifier registration request, and the gateway device may receive the user identifier registration request of the terminal.

For a manner of generating the virtual network address, in a possible implementation, the gateway device may store a plurality of virtual network addresses and may select one virtual network address from virtual network addresses that are currently not occupied and allocate the virtual network address to the second network device, so as to achieve the effect of generating the virtual network address for the second network device. For example, the virtual network addresses that are currently not occupied may be arranged in ascending or descending order of addresses. The gateway device may select the first virtual network address of the virtual network addresses that are currently not occupied as the virtual network address of the second network device.

Optionally, the gateway device may transmit the generated virtual network address of the second network device to the OSS of the blockchain. For example, the virtual network address of the second network device may keep data synchronization between the gateway device and the OSS. In a case that the gateway device generates the virtual network address of the second network device, the OSS of the blockchain may synchronously record the virtual network address of the second network device.

Optionally, in a case that a new user is added to the blockchain system, the OSS of the blockchain may further determine a blockchain node associated with the user identifier, record a second mapping relationship between a user identifier and a blockchain node, and transmit the recorded second mapping relationship to the second network device, so that the second network device obtains the second mapping relationship, so as to perform the process of authentication according to the second mapping relationship in the foregoing step 207.

402: The OSS of the blockchain generates at least one mapping port number for at least one blockchain node associated with a user.

For each blockchain node associated with the user, the OSS of the blockchain may generate the mapping port number corresponding to the blockchain node. Different mapping port numbers may be generated for different blockchain nodes, so that the first network device may recognize, according to each mapping port number, a data packet transmitted to each blockchain node.

403: The OSS of the blockchain transmits a mapping port number of at least one blockchain node and the virtual network address of the second network device to the first network device.

The OSS of the blockchain may determine a private network corresponding to the user identifier, determine a network device arranged in the private network, and transmit a mapping port of the blockchain node and the virtual network address of the second network device to the network device. In a case that the user identifier is a user identifier of a first private network, the OSS of the blockchain determines the first private network and the first network device, and transmits the mapping port of the blockchain node and the virtual network address of the second network device to the first network device.

The mapping port of the blockchain node and the virtual network address of the second network device are transmitted to the network device corresponding to the user identifier. An actual association between the user and the blockchain node is considered. The first network device only needs to listen to the mapping port corresponding to the blockchain node associated with the user identifier, but does not need to listen to mapping ports corresponding to blockchain nodes in the entire blockchain system, so as to reduce a quantity of mapping ports occupied in the first network device, thereby saving processing resources and a storage space of the first network device, and at the same time reducing the operation load of a listening process in the first network device, so as to reduce energy consumption.

404: The first network device receives the mapping port number corresponding to the blockchain node in the blockchain system and the virtual network address of the second network device.

405: The first network device uses a port corresponding to each mapping port number as the mapping port corresponding to the blockchain node, and starts to listen to at least one mapping port.

For each port number of the at least one port number, the first network device may turn on a port corresponding to the port number in a local device, use the port as a mapping port corresponding to the blockchain node, that is, allocate the port as a port transmitting a data packet to a corresponding blockchain node, and listen to the mapping port, so that a data packet may be received during listening in the foregoing step 402.

The foregoing is only described by using an example in which a mapping port number corresponding to each blockchain node in the blockchain system is generated in a full update manner. In a possible implementation, an incremental update manner may be used to generate a mapping port number corresponding to an added blockchain node in the blockchain system. That is, every time a blockchain node is added to the blockchain system, the OSS of the blockchain only needs to generate a mapping port number corresponding to the added blockchain node and transmit the mapping port number corresponding to the added blockchain node to the first network device, but does not need to generate a mapping port number again for a blockchain node from which a mapping port number has been generated before. Correspondingly, the first network device receives the mapping port number corresponding to the added blockchain node, and starts to listen to the corresponding mapping port for the added blockchain node.

In an exemplary application scenario, with the continuous expansion of the application scope of blockchains, an increasingly large number of service providers are added to a blockchain contract. The scale of the blockchain system keeps growing. Blockchain nodes are often added to the blockchain system. Therefore, every time a user identifier is registered in the blockchain system, the OSS of the blockchain may generate a mapping port number corresponding to each blockchain node for the user identifier. Subsequently, every time a blockchain node is added to the blockchain system, the OSS of the blockchain generates the mapping port number corresponding to the added blockchain node for the user identifier.

In this manner of updating a mapping port number, first, in a case that blockchain nodes are continuously added to the blockchain system, it can be ensured that a registered user identifier can transmit data packets to existing blockchain nodes in the blockchain system during registration and can also transmit data packets to blockchain nodes added after registration. Secondly, every time a blockchain node is added to the blockchain system, the OSS of the blockchain does not need to generate a mapping port number again for a blockchain node for which a mapping port number has been generated, thereby reducing the operation amount and the load of the OSS of the blockchain.

Figure 5:
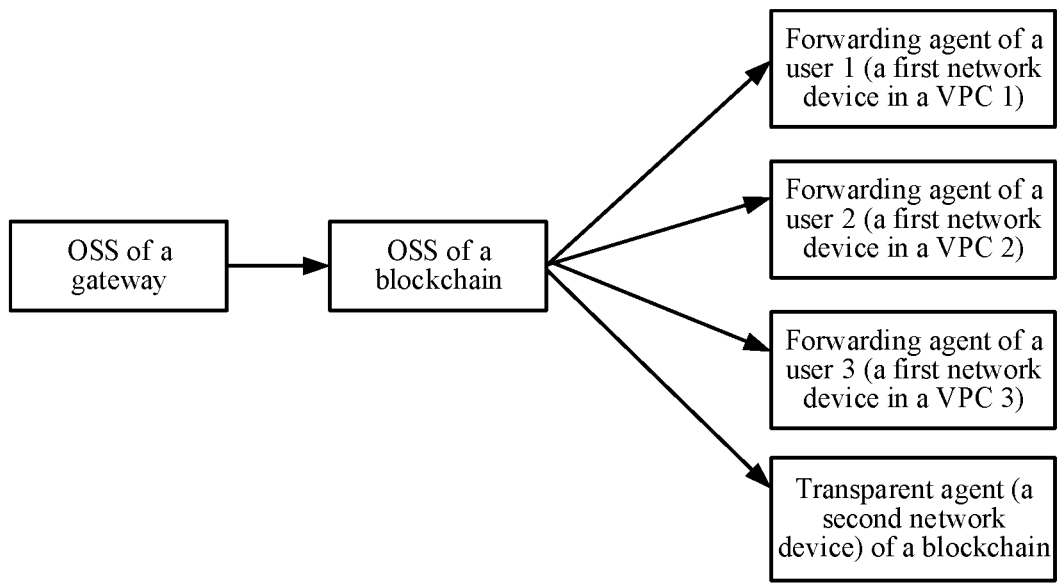
FIG. 5 is a schematic diagram of a network configuration according to an embodiment of this application.

FIG. 5 is a schematic diagram of a network configuration according to an embodiment of this application. After generating a virtual network address of a second network device, an OSS of a gateway device may transmit the virtual network address of the second network device to the OSS of the blockchain. The OSS of the blockchain transmits the virtual network address of the second network device to a forwarding agent (that is, a first network device) of each private network and a transparent agent (that is, the second network device) of a blockchain system.

In the method provided in this embodiment, in a case that a new user is added to a blockchain system or an old user is newly associated with a blockchain node in the blockchain system, a corresponding mapping port is generated for the blockchain node, and network configuration is performed on each device to open a communication channel between different private networks, so that a terminal in a first private network can transmit a data packet to a blockchain node in a second private network, so as to satisfy a requirement of accessing a blockchain node by a user.

Figure 6:
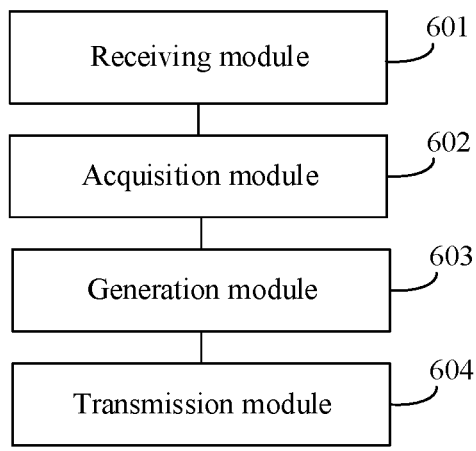
FIG. 6 is a schematic structural diagram of a network communication apparatus according to an embodiment of this application.

FIG. 6 is a schematic structural diagram of a network communication apparatus according to an embodiment of this application. The apparatus is applied to a first network device in a first private network and includes a receiving module 601, an acquisition module 602, a generation module 603, and a transmission module 604.

The receiving module 601 is configured to receive a first data packet transmitted to a target blockchain node in a second private network. The acquisition module 602 is configured to acquire an actual network address of the target blockchain node, the actual network address being an intranet address of the target blockchain node in the second private network. The generation module 603 is configured to generate a second data packet according to the first data packet and the actual network address, the second data packet carrying the first data packet and the actual network address. The transmission module 604 is configured to transmit the second data packet to a virtual network address of a second network device in the second private network, the virtual network address being used for a gateway device to forward a received data packet to the second network device.

In a possible implementation, the generation module 603 is configured to: generate the redirection packet header carrying the actual network address; and add the redirection packet header to the first data packet, to obtain the second data packet.

In a possible implementation, the acquisition module 602 is configured to: acquire the mapping port number carried in the first data packet; search a first mapping relationship between a mapping port number of a blockchain node and an actual network address, to obtain an actual network address corresponding to the mapping port number; and use the actual network address corresponding to the mapping port number as the actual network address of the target blockchain node.

In a possible implementation, the receiving module 601 is configured to receive the first data packet in the process of listening to the mapping port corresponding to the target blockchain node.

In a possible implementation, the receiving module 601 is configured to: receive a mapping port number corresponding to the blockchain node in a blockchain system; use a port corresponding to the mapping port number in the first network device as the mapping port corresponding to the blockchain node; and start to listen to the port corresponding to the mapping port number.

Figure 7:
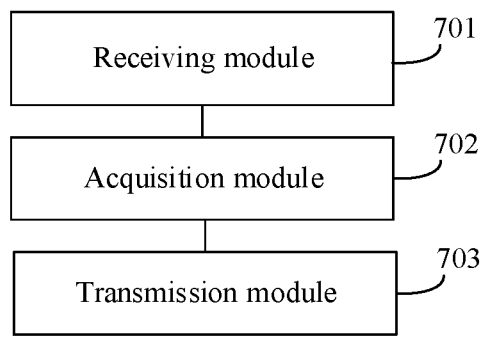
FIG. 7 is a schematic structural diagram of a network communication apparatus according to an embodiment of this application.

FIG. 7 is a schematic structural diagram of a network communication apparatus according to an embodiment of this application. Referring to FIG. 7, the apparatus includes a receiving module 701, an acquisition module 702, and a transmission module 703.

The receiving module 701 is configured to receive a second data packet of a gateway device, the second data packet carrying a first data packet of a terminal in a first private network and an actual network address of a target blockchain node in a second private network, and the actual network address being an intranet address of the target blockchain node in the second private network. The acquisition module 702 is configured to acquire the actual network address from the second data packet. The transmission module 703 is configured to transmit the first data packet to the target blockchain node according to the actual network address.

In a possible implementation, the acquisition module 702 is configured to parse the redirection packet header in the second data packet, to obtain the actual network address carried in the redirection packet header.

In a possible implementation, the transmission module 703 is configured to transmit the second data packet to the actual network address of the target blockchain node in a case that the terminal has the right to access the target blockchain node.

In a possible implementation, the acquisition module 702 is configured to: acquire a user identifier carried in the second data packet; and the apparatus further includes an authentication module, configured to: search a second mapping relationship between a user identifier and a blockchain node, to obtain at least one blockchain node corresponding to the user identifier; and determine that the terminal has the right to access the target blockchain node in a case that the target blockchain node belongs to the at least one blockchain node.

All the foregoing optional technical solution may be combined in any manner to form optional embodiments of the disclosure. Details are not described herein again one by one.

In a case that the network communication apparatus provided in the foregoing embodiments performs network communication, the foregoing division of functional modules is only used as an example for description. In practical applications, the foregoing functions may be allocated to be accomplished by different functional modules as required, that is, the internal structure of the at least one of the first network device and the second network device is divided into different functional modules to accomplish all or some of the functions described above. In addition, the network communication apparatus provided in the foregoing embodiments share the same concept with the embodiments of the network communication method, and reference may be made to the method embodiments for the specific implementation process of the apparatus, which is no longer elaborated herein.

Figure 8:
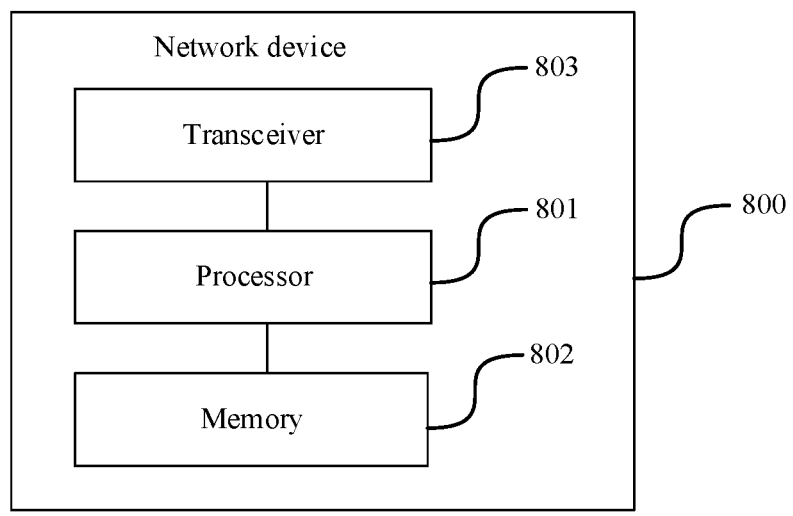
FIG. 8 is a schematic structural diagram of a network device according to an embodiment of this application.

FIG. 8 is a schematic structural diagram of a network device according to an embodiment of this application. A network device 800 may vary greatly due to different configuration or performance, and may include one or more processors (central processing units, CPUs) 801, one or more memories 802, and a transceiver 803. The memory 802 stores at least one instruction. The at least one instruction is loaded and executed by a processor 801 to implement the method provided in the foregoing method embodiments. The processor 801 controls the transceiver 803 perform the receiving and transmission steps in the foregoing embodiments. Certainly, the network device may further have components such as a wired or wireless network interface and an input/output interface for input and output. The network device may further include another component configured to implement device functions. Details are not described herein.

Specifically, the foregoing instruction may be loaded and executed by the processor of the network device 800 to perform the following network communication method: receiving, by the transceiver, a first data packet transmitted to a target blockchain node in a second private network; acquiring, by the processor, an actual network address of the target blockchain node, the actual network address being an intranet address of the target blockchain node in the second private network; generating, by the processor, a second data packet according to the first data packet and the actual network address, the second data packet carrying the first data packet and the actual network address; and transmitting, by the transceiver, the second data packet to a virtual network address of a second network device in the second private network, the virtual network address being used for a gateway device to forward a received data packet to the second network device.

In a possible implementation, the processor is configured to: generate the redirection packet header carrying the actual network address; and add the redirection packet header to the first data packet, to obtain the second data packet.

In a possible implementation, the processor is configured to: acquire the mapping port number carried in the first data packet; search a first mapping relationship between a mapping port number and an actual network address of a blockchain node, to obtain the actual network address corresponding to the mapping port number; and use the actual network address corresponding to the mapping port number as the actual network address of the target blockchain node.

In a possible implementation, the transceiver is configured to receive the first data packet in a process of listening to the mapping port corresponding to the target blockchain node.

In a possible implementation, the processor is configured to: receive a mapping port number corresponding to the blockchain node in a blockchain system; use a port corresponding to the mapping port number in a first network device as the mapping port corresponding to the blockchain node; and start to listen to the port corresponding to the mapping port number.

Specifically, the foregoing instruction may be loaded and executed by the processor of the network device 800 to perform the following network communication method: receiving, by the transceiver, the second data packet of the gateway device, the second data packet carrying the first data packet transmitted to the target blockchain node in the second private network and the actual network address of the target blockchain node, and the actual network address being an intranet address of the target blockchain node in the second private network; acquiring, by the processor, the actual network address from the second data packet; and transmitting, by the transceiver, the second data packet to the actual network address of the target blockchain node.

In a possible implementation, the processor is configured to parse the redirection packet header in the second data packet, to obtain the actual network address carried in the redirection packet header.

In a possible implementation, the processor is configured to transmit the second data packet to the actual network address of the target blockchain node in a case that a terminal has the right to access the target blockchain node.

In a possible implementation, the processor is configured to: acquire a user identifier carried in the second data packet; search a second mapping relationship between a user identifier and a blockchain node, to obtain at least one blockchain node corresponding to the user identifier; and determine that the terminal has the right to access the target blockchain node in a case that the target blockchain node belongs to the at least one blockchain node.

An exemplary embodiment further provides a non-transitory computer-readable storage medium, for example, a memory including an instruction. For example, the non-transitory computer-readable storage medium may be a read-only memory (ROM), a random access memory (RAM), a compact disc read-only memory (CD-ROM), a magnetic tape, a floppy disk, an optical data storage device or the like. Specifically, the instruction may be executed by a processor to complete the following network communication method: receiving a first data packet transmitted to a target blockchain node in a second private network; acquiring an actual network address of the target blockchain node, the actual network address being an intranet address of the target blockchain node in the second private network; generating a second data packet according to the first data packet and the actual network address, the second data packet carrying the first data packet and the actual network address; and transmitting the second data packet to a virtual network address of a second network device in the second private network, the virtual network address being used for a gateway device to forward a received data packet to the second network device.

An exemplary embodiment further provides a non-transitory computer-readable storage medium, for example, a memory including an instruction. For example, the non-transitory computer-readable storage medium may be a ROM, a RAM, a CD-ROM, a magnetic tape, a floppy disk, an optical data storage device or the like. Specifically, the instruction may be executed by a processor to complete the following network communication method:

receiving a second data packet of a gateway device, the second data packet carrying a first data packet transmitted to a target blockchain node in a second private network and an actual network address of the target blockchain node, and the actual network address being an intranet address of the target blockchain node in the second private network; acquiring the actual network address from the second data packet; and transmitting the second data packet to the actual network address of the target blockchain node.

In a possible implementation, the generating the second data packet according to the first data packet and the actual network address includes: generating the redirection packet header carrying the actual network address; and adding the redirection packet header to the first data packet, to obtain the second data packet.

In a possible implementation, the acquiring the actual network address of the target blockchain node includes: acquiring the mapping port number carried in the first data packet; searching a first mapping relationship between a mapping port number and an actual network address of a blockchain node, to obtain the actual network address corresponding to the mapping port number; and using the actual network address corresponding to the mapping port number as the actual network address of the target blockchain node.

In a possible implementation, the receiving the first data packet transmitted to the target blockchain node in the second private network includes: receiving the first data packet in a process of listening to the mapping port corresponding to the target blockchain node.

In a possible implementation, before the receiving the first data packet transmitted to the target blockchain node in the second private network, the method further includes: receiving a mapping port number corresponding to the blockchain node in a blockchain system; using a port corresponding to the mapping port number in a first network device as the mapping port corresponding to the blockchain node; and starting to listen to the port corresponding to the mapping port number.

In a possible implementation, the acquiring the actual network address from the second data packet includes: parsing the redirection packet header in the second data packet, to obtain the actual network address carried in the redirection packet header.

In a possible implementation, the transmitting the second data packet to the actual network address of the target blockchain node includes: transmitting the second data packet to the actual network address of the target blockchain node in a case that a terminal has the right to access the target blockchain node.

In a possible implementation, before the transmitting the second data packet to the actual network address of the target blockchain node, the method further includes: acquiring a user identifier carried in the second data packet; searching a second mapping relationship between a user identifier and a blockchain node, to obtain at least one blockchain node corresponding to the user identifier; and determining that the terminal has the right to access the target blockchain node in a case that the target blockchain node belongs to the at least one blockchain node.

Persons of ordinary skill in the art may understand that all or some of the steps of the foregoing embodiments may be implemented by using hardware, or may be implemented by a program instructing relevant hardware. The program may be stored in a non-transitory computer-readable storage medium. The above-mentioned non-transitory computer-readable storage medium may be a ROM, a magnetic disk, an optical disc, or the like.

The foregoing descriptions are merely preferred embodiments of this application, but are not intended to limit this application. Any modification, equivalent replacement, or improvement made within the spirit and principle of this application shall fall within the protection scope of this application.

What is claimed is:

1. A network communication method, applied to a network communication system including a first network device in a first private network, a second network device in a second private network and a gateway device coupling the first private network to the second private network, the method comprising:
   receiving, by the first network device, a first data packet transmitted from a terminal in the first private network to a target blockchain node in the second private network;
   acquiring, by the first network device, an actual network address of the target blockchain node, the actual network address being an intranet address of the target blockchain node in the second private network, further including:
      acquiring, by the first network device, a mapping port number carried in the first data packet; and
      searching, by the first network device, a first mapping relationship between a respective mapping port number and a respective actual network address of a blockchain node, to obtain an actual network address corresponding to the mapping port number as the actual network address of the target blockchain node;
   generating, by the first network device, a second data packet according to the first data packet and the actual network address, the second data packet carrying the first data packet and the actual network address; and
   transmitting, by the first network device, the second data packet to a virtual network address of the second network device in the second private network, the virtual network address being used for the gateway device to forward a received data packet including the second data packet to the second network device.

2. The method according to claim 1, wherein the generating, by the first network device, a second data packet according to the first data packet and the actual network address comprises:
   generating, by the first network device, a redirection packet header carrying the actual network address; and
   adding, by the first network device, the redirection packet header to the first data packet, to obtain the second data packet.

3. The method according to claim 1, wherein the receiving, by the first network device, the first data packet transmitted to the target blockchain node in the second private network comprises:
  receiving, by the first network device, the first data packet in a process of listening to the mapping port corresponding to the target blockchain node by the first network device.

4. The method according to claim 3, further comprising:
  before receiving, by the first network device, a first data packet transmitted to a target blockchain node in a second private network:
  receiving, by the first network device, a mapping port number corresponding to the blockchain node in a blockchain system;
  using, by the first network device, a port corresponding to the mapping port number in the first network device as the mapping port corresponding to the blockchain node; and
  starting, by the first network device, to listen to the port corresponding to the mapping port number.

5. The method according to claim 1, further comprising:
  receiving, by the second network device, the second data packet from the gateway device;
  acquiring, by the second network device, the actual network address from the second data packet; and
  transmitting, by the second network device, the second data packet to the actual network address of the target blockchain node.

6. The method according to claim 5, wherein the acquiring, by the second network device, the actual network address from the second data packet comprises:
  parsing, by the second network device, a redirection packet header in the second data packet, to obtain the actual network address carried in the redirection packet header.

7. The method according to claim 5, wherein the transmitting, by the second network device, the second data packet to the actual network address of the target blockchain node comprises:
  transmitting, by the second network device, the second data packet to the actual network address of the target blockchain node in a case that the terminal in the first private network has the right to access the target blockchain node.

8. The method according to claim 7, further comprising:
  before transmitting, by the second network device, the second data packet to the actual network address of the target blockchain node:
  acquiring, by the second network device, a user identifier carried in the second data packet;
  searching, by the second network device, a second mapping relationship between a user identifier and a blockchain node, to obtain at least one blockchain node corresponding to the user identifier; and
  determining, by the second network device, that the terminal in the first private network has the right to access the target blockchain node in a case that the target blockchain node belongs to the at least one blockchain node.

9. A network communication system, comprising a first network device in a first private network, a second network device in a second private network, and a gateway device coupling the first private network to the second private network, wherein the first network device, the second network device, and the gateway device are configured to perform a plurality of operations including:
  receiving, by the first network device, a first data packet transmitted from a terminal in the first private network to a target blockchain node in the second private network;
  acquiring, by the first network device, an actual network address of the target blockchain node, the actual network address being an intranet address of the target blockchain node in the second private network, further including:
    acquiring, by the first network device, a mapping port number carried in the first data packet; and
    searching, by the first network device, a first mapping relationship between a respective mapping port number and a respective actual network address of a blockchain node, to obtain an actual network address corresponding to the mapping port number as the actual network address of the target blockchain node;
  generating, by the first network device, a second data packet according to the first data packet and the actual network address, the second data packet carrying the first data packet and the actual network address; and
  transmitting, by the first network device, the second data packet to a virtual network address of the second network device in the second private network, the virtual network address being used for the gateway device to forward a received data packet including the second data packet to the second network device.

10. The network communication system according to claim 9, wherein the generating, by the first network device, a second data packet according to the first data packet and the actual network address comprises:
  generating, by the first network device, a redirection packet header carrying the actual network address; and
  adding, by the first network device, the redirection packet header to the first data packet, to obtain the second data packet.

11. The network communication system according to claim 9, wherein the receiving, by the first network device, the first data packet transmitted to the target blockchain node in the second private network comprises:
  receiving, by the first network device, the first data packet in a process of listening to the mapping port corresponding to the target blockchain node by the first network device.

12. The network communication system according to claim 11, wherein the plurality of operations further comprise:
  before receiving, by the first network device, a first data packet transmitted to a target blockchain node in a second private network:
  receiving, by the first network device, a mapping port number corresponding to the blockchain node in a blockchain system;
  using, by the first network device, a port corresponding to the mapping port number in the first network device as the mapping port corresponding to the blockchain node; and
  starting, by the first network device, to listen to the port corresponding to the mapping port number.

13. The network communication system according to claim 9, wherein the plurality of operations further comprise:
  receiving, by the second network device, the second data packet from the gateway device;
  acquiring, by the second network device, the actual network address from the second data packet; and transmitting, by the second network device, the second data packet to the actual network address of the target blockchain node.

14. The network communication system according to claim 13, wherein the acquiring, by the second network device, the actual network address from the second data packet comprises:
parsing, by the second network device, a redirection packet header in the second data packet, to obtain the actual network address carried in the redirection packet header.

15. The network communication system according to claim 13, wherein the transmitting, by the second network device, the second data packet to the actual network address of the target blockchain node comprises:
transmitting, by the second network device, the second data packet to the actual network address of the target blockchain node in a case that the terminal in the first private network has the right to access the target blockchain node.

16. The network communication system according to claim 15, wherein the plurality of operations further comprise:
before transmitting, by the second network device, the second data packet to the actual network address of the target blockchain node:
acquiring, by the second network device, a user identifier carried in the second data packet;
searching, by the second network device, a second mapping relationship between a user identifier and a blockchain node, to obtain at least one blockchain node corresponding to the user identifier; and
determining, by the second network device, that the terminal in the first private network has the right to access the target blockchain node in a case that the target blockchain node belongs to the at least one blockchain node.

17. A non-transitory computer-readable storage medium, storing at least one instruction, the instruction being loaded and executed by a network communication system comprising a first network device in a first private network, a second network device in a second private network, and a gateway device coupling the first private network to the second private network, wherein the first network device, the second network device, and the gateway device are configured to perform a plurality of operations including:
receiving, by the first network device, a first data packet transmitted from a terminal in the first private network to a target blockchain node in the second private network;
acquiring, by the first network device, an actual network address of the target blockchain node, the actual network address being an intranet address of the target blockchain node in the second private network, further including:
acquiring, by the first network device, a mapping port number carried in the first data packet; and
searching, by the first network device, a first mapping relationship between a respective mapping port number and a respective actual network address of a blockchain node, to obtain an actual network address corresponding to the mapping port number as the actual network address of the target blockchain node;
generating, by the first network device, a second data packet according to the first data packet and the actual network address, the second data packet carrying the first data packet and the actual network address; and
transmitting, by the first network device, the second data packet to a virtual network address of the second network device in the second private network, the virtual network address being used for the gateway device to forward a received data packet including the second data packet to the second network device.

18. The non-transitory computer-readable storage medium according to claim 17, wherein the plurality of operations further comprise:
receiving, by the second network device, the second data packet from the gateway device;
acquiring, by the second network device, the actual network address from the second data packet; and
transmitting, by the second network device, the second data packet to the actual network address of the target blockchain node.

19. The non-transitory computer-readable storage medium according to claim 17, wherein the generating, by the first network device, a second data packet according to the first data packet and the actual network address comprises:
generating, by the first network device, a redirection packet header carrying the actual network address; and
adding, by the first network device, the redirection packet header to the first data packet, to obtain the second data packet.

20. The non-transitory computer-readable storage medium according to claim 17, wherein the receiving, by the first network device, the first data packet transmitted to the target blockchain node in the second private network comprises:
receiving, by the first network device, the first data packet in a process of listening to the mapping port corresponding to the target blockchain node by the first network device.

* * * * *